(12) United States Patent
Grubert et al.

(10) Patent No.: US 9,044,734 B2
(45) Date of Patent: Jun. 2, 2015

(54) DIESEL OXIDATION CATALYST WITH LAYERED STRUCTURE CONTAINING CERIA COMPOSITION AS PALLADIUM SUPPORT MATERIAL FOR ENHANCED HC AND CO GAS CONVERSION

(71) Applicants: BASF SE, Ludwigshafen (DE); BASF Corporation, Florham Park, NJ (US)

(72) Inventors: Gerd Grubert, Hannover (DE); Torsten Neubauer, Langenhagen (DE); Alfred Punke, Walle (DE); Marcus Hilgendorff, Hannover (DE); Torsten Müller-Stach, Hannover (DE); Olga Gerlach, Ludwigshafen (DE); Xinyi Wei, Princeton, NJ (US); Jeffrey Hoke, North Brunswick, NJ (US); Shiang Sung, New York, NY (US); Stanley Roth, Yardley, PA (US)

(73) Assignees: BASF SE, Ludwigshafen (DE); BASF CORPORATION, Florham Park, NJ (US)

( * ) Notice: Subject to any disclaimer, the term of this patent is extended or adjusted under 35 U.S.C. 154(b) by 61 days.

(21) Appl. No.: 13/624,524

(22) Filed: Sep. 21, 2012

(65) Prior Publication Data

US 2013/0084222 A1    Apr. 4, 2013

Related U.S. Application Data

(60) Provisional application No. 61/538,213, filed on Sep. 23, 2011.

(51) Int. Cl.
*B01J 23/63* (2006.01)
*B01D 53/94* (2006.01)
(Continued)

(52) U.S. Cl.
CPC ........ *B01J 29/04* (2013.01); *B01J 23/63* (2013.01); *B01D 53/9477* (2013.01);
(Continued)

(58) Field of Classification Search
None
See application file for complete search history.

(56) References Cited

U.S. PATENT DOCUMENTS

| 4,727,052 A | 2/1988 | Wan et al. |
| 4,961,917 A | 10/1990 | Byrne |

(Continued)

FOREIGN PATENT DOCUMENTS

| CN | 1277892 | 12/2000 |
| EP | 1985352 | 10/2008 |

(Continued)

OTHER PUBLICATIONS

Jung, Jae-Young et al., "Enhanced solubility and dissolution rate of itraconzaole by a solid dispersion technique", *International Journal of Pharmaceutics* 187 1999, 209-218.

(Continued)

*Primary Examiner* — Walter D Griffin
*Assistant Examiner* — Jelitza Perez
(74) *Attorney, Agent, or Firm* — Servilla Whitney LLC (57) ABSTRACT

The present invention relates to a layered diesel oxidation catalyst (DOC) comprising: a) a carrier substrate; b) a diesel oxidation catalytic material comprising b1) a first layer located on the carrier substrate, the first layer comprising palladium impregnated on a support material comprising ceria in an amount of at least 45 weight-% based on the total weight of the support material, and optionally comprising platinum; b2) a second layer located on the first layer, the second layer comprising palladium and platinum each impregnated on a support material comprising a metal oxide; wherein the platinum to palladium weight ratio of the first layer is lower than the platinum to palladium weight ratio of the second layer.

31 Claims, 3 Drawing Sheets

(51) Int. Cl.
*B01J 29/04* (2006.01)
*B01J 37/02* (2006.01)
*B01J 29/70* (2006.01)
*B01J 35/04* (2006.01)
*B01J 35/02* (2006.01)
*B01J 37/00* (2006.01)

(52) U.S. Cl.
CPC ..... *B01D 53/944* (2013.01); *B01D 2255/1021* (2013.01); *B01D 2255/1023* (2013.01); *B01D 2255/9025* (2013.01); *B01D 2258/012* (2013.01); *B01J 37/0244* (2013.01); *B01J 37/0246* (2013.01); *B01J 29/7007* (2013.01); *B01J 35/04* (2013.01); *B01J 2523/00* (2013.01); *B01J 35/023* (2013.01); *B01J 37/0036* (2013.01)

(56) References Cited

U.S. PATENT DOCUMENTS

| | | | |
|---|---|---|---|
| 5,491,120 | A | 2/1996 | Voss et al. |
| 5,516,497 | A | 5/1996 | Speronello et al. |
| 6,153,160 | A | 11/2000 | Voss et al. |
| 6,171,556 | B1 | 1/2001 | Burk et al. |
| 6,255,249 | B1 | 7/2001 | Voss et al. |
| 6,624,210 | B1 | 9/2003 | Petereit et al. |
| 7,160,558 | B2 | 1/2007 | Petereit et al. |
| 7,175,857 | B2 | 2/2007 | Petereit et al. |
| 7,947,238 | B2 | 5/2011 | Deeba |
| 2008/0045405 | A1 | 2/2008 | Beutel et al. |
| 2010/0166629 | A1* | 7/2010 | Deeba ................... 423/213.5 |
| 2010/0180582 | A1* | 7/2010 | Mueller-Stach et al. ....... 60/297 |
| 2011/0033532 | A1 | 2/2011 | Angel et al. |

FOREIGN PATENT DOCUMENTS

| | | |
|---|---|---|
| JP | 2265648 | 10/1990 |
| WO | WO-93/10885 | 6/1993 |
| WO | WO9310885 | 6/1993 |
| WO | WO-00/05307 | 2/2000 |
| WO | WO-02/067906 | 9/2002 |
| WO | WO-2004/019918 | 3/2004 |
| WO | WO-2007/115381 | 10/2007 |
| WO | WO-2009/016258 | 2/2009 |
| WO | WO-2010/015713 | 2/2010 |
| WO | WO-2010/083313 | 7/2010 |
| WO | WO2010077843 | 7/2010 |
| WO | WO-2010/133309 | 11/2010 |
| WO | WO-2012/031934 | 3/2012 |
| WO | WO-2012/041788 | 4/2012 |
| WO | WO-2012/116940 | 9/2012 |
| WO | WO-2012/116941 | 9/2012 |
| WO | WO-2013/131986 | 9/2013 |

OTHER PUBLICATIONS

Leuner, Christian et al., "Improving drug solubility for oral delivery using solid dispersions", *European Journal of Pharmaceutics and Biopharmaceutics 50* 2000, 47-60.

Six, Karel et al., "Increased Physical Stability and Improved Dissolution Properties of Itraconazole, a Class II Drug, by Solid Dispersions that Combine Fast- and Slow-Dissolving Polymers", *Journal of Pharmaceutical Sciences*, vol. 93, No. 1 Jan. 2004, 124-131.

U.S. Appl. No. 13/919,092, Active-Ingredient-Containing Solid Dispersions Based on Diethylaminoethyl Methacrylate Copolymers, filed Jun. 17, 2013, 32 pgs.

International Search Report, mailed Feb. 28, 2013, for PCT/IB2012/055030, which corresponds to U.S. Appl. No. 13/624,524.

PCT International Search Report and Written Opinion in PCT/IB2012/055030, mailed Apr. 3, 2014, 9 pages.

* cited by examiner

DIESEL OXIDATION CATALYST WITH LAYERED STRUCTURE CONTAINING CERIA COMPOSITION AS PALLADIUM SUPPORT MATERIAL FOR ENHANCED HC AND CO GAS CONVERSION

TECHNICAL FIELD

Embodiments of the present invention relate to layered oxidation catalysts, in particular for the treatment of diesel engine exhaust, containing ceria as palladium support material.

BACKGROUND

Operation of lean burn engines, e.g. diesel engines and lean burn gasoline engines, provide the user with excellent fuel economy, and have very low emissions of gas phase hydrocarbons and carbon monoxide due to their operation at high air/fuel ratios under fuel lean conditions. Diesel engines, in particular, also offer significant advantages over gasoline engines in terms of their fuel economy, durability, and their ability to generate high torque at low speed. From the standpoint of emissions, however, diesel engines present problems more severe than their spark-ignition counterparts. Emission problems relate to particulate matter (PM), nitrogen oxides (NOx), unburned hydrocarbons (HC) and carbon monoxide (CO). NOx is a term used to describe various chemical species of nitrogen oxides, including nitrogen monoxide (NO) and nitrogen dioxide ($NO_2$), among others.

Oxidation catalysts comprising precious metals such as platinum group metals (PGM) dispersed on a refractory metal oxide support are known for use in treating the exhaust of diesel engines in order to convert both hydrocarbon and carbon monoxide gaseous pollutants by catalyzing the oxidation of these pollutants to carbon dioxide and water. Such catalysts have been generally contained in units called diesel oxidation catalysts (DOC), or more simply catalytic converters, which are placed in the exhaust flow path from a diesel powered engine to treat the exhaust before it vents to the atmosphere. Typically, the diesel oxidation catalysts are formed on ceramic or metallic substrate carriers upon which one or more catalyst coating compositions are deposited. In addition to the conversions of gaseous HC, CO and the soluble organic fraction (SOF) of particulate matter, oxidation catalysts containing platinum group metals dispersed on a refractory oxide support promote the oxidation of nitric oxide (NO) to nitric dioxide ($NO_2$).

As is well-known in the art, catalysts used to treat the exhaust of internal combustion engines are less effective during periods of relatively low temperature operation, such as the initial cold-start period of engine operation, because the engine exhaust is not at a temperature sufficiently high for efficient catalytic conversion of noxious components in the exhaust. To this end, it is known in the art to include an adsorbent material, which may be a zeolite, as part of a catalytic treatment system in order to adsorb gaseous pollutants, usually hydrocarbons, and retain them during the initial cold-start period. As the exhaust gas temperature increases, the adsorbed hydrocarbons are driven from the adsorbent and subjected to catalytic treatment at the higher temperature. In this regard, U.S. Pat. No. 5,125,231 discloses the use of platinum group metal-doped zeolites as low temperature hydrocarbon adsorbents as well as oxidation catalysts.

As discussed hereinabove, oxidation catalysts comprising a platinum group metal (PGM) dispersed on a refractory metal oxide support are known for use in treating exhaust gas emissions from diesel engines. Platinum (Pt) remains the most effective platinum group metal for oxidizing CO and HC in a DOC, after high temperature aging under lean conditions and in the presence of fuel sulfur. Nevertheless, one of the major advantages of using palladium (Pd) based catalysts is the lower cost of Pd compared to Pt. However, Pd based DOCs typically show higher light-off temperatures for oxidation of CO and HC, especially when used with HC storage materials, potentially causing a delay in HC and or CO light-off. Pd containing DOCs may poison the activity of Pt to convert paraffins and/or oxidize NO and may also make the catalyst more susceptible to sulfur poisoning. These characteristics have typically prevented the use of Pd as an oxidation catalyst in lean burn operations especially for light duty diesel applications where engine temperatures remain below 250° C. for most driving conditions. As emissions regulations become more stringent, there is a continuing goal to develop diesel oxidation catalyst (DOC) systems that provide improved performance, for example, light-off performance.

WO2010/133309 discloses Pd enriched diesel oxidation catalysts and their application as catalysts for the oxidation of CO and HC emissions from a compression ignition/diesel engine.

WO2010/083313 discloses a diesel oxidation catalyst comprising at least two, specifically three distinct layers, at least one of which contains an oxygen storage compound (OSC) that is present in a layer separate from the majority of the platinum group metal (PGM) components, such as palladium and platinum.

US 2008/045405 discloses a diesel oxidation catalyst for the treatment of exhaust gas emissions, such as the oxidation of unburned hydrocarbons and carbon monoxide, and the reduction of nitrogen oxides. More particularly, US 2008/045405 is directed to a washcoat composition comprising two distinct washcoat layers containing two distinctly different weight ratios of Pt:Pd.

However, these prior art DOCs still show unsatisfactory breakthrough of HC and CO. Further, hydrocarbon storage capacity of these prior art DOCs is enhanced at the expense of the catalytic activity of the catalyst.

Consequently, the present invention is directed to a diesel oxidation catalyst with a layered structure in order to maximize the hydrocarbon storage capacity without sacrificing the catalytic activity of the catalyst. Some embodiments of the invention provide a DOC which continually supports the oxidation and abatement of CO and unburned HC and thus allows for a minimum breakthrough of HC and CO. Additionally, one or more embodiments of the present invention provide a DOC which, due to the rarity and consequently costs of precious metal components usually used for the preparation of DOCs, contains a reduced amount of platinum in the catalyst composition allowing for reduced costs for the DOC without reducing the catalytic efficiency. There is also a goal to utilize other components of DOCs, for example the zeolites, ceria, and palladium, as efficiently as possible.

SUMMARY

Provided is a layered diesel oxidation catalyst (DOC) comprising:
a) a carrier substrate;
b) a diesel oxidation catalytic material comprising
b1) a first layer located on the carrier substrate, the first layer comprising palladium impregnated on a support material comprising ceria in an amount of at least 45 weight-% based on the total weight of the support material, and optionally comprising platinum;

b2) a second layer located on the first layer, the second layer comprising palladium and platinum each impregnated on a support material comprising a metal oxide;

wherein the platinum to palladium weight ratio of the first layer is lower than the platinum to palladium weight ratio of the second layer.

Further provided is a process for the preparation of such layered diesel oxidation catalyst comprising the steps of (i) providing a carrier substrate;
(ii) optionally applying an undercoat layer on the carrier substrate;
(iii) applying a first layer on the carrier substrate or the undercoat layer, the first layer comprising palladium impregnated on a support material comprising ceria in an amount of at least 45 weight-% based on the total weight of the support material, and optionally comprising platinum;
(iv) applying a second layer on the first layer, the second layer comprising palladium and platinum each impregnated on a support material comprising a metal oxide, wherein the platinum to palladium weight ratio of the first layer is lower than the platinum to palladium weight ratio of the second layer;
(v) optionally applying a third layer on the second layer, the third layer comprising palladium impregnated on a support material comprising ceria in an amount of at least 45 weight-% based on the total weight of the support material, and optionally comprising platinum; wherein the platinum to palladium weight ratio of the third layer is lower than the platinum to palladium weight ratio of the second layer.

Yet further provided is a system for treating a gaseous exhaust stream of a diesel engine, the system comprising:
an exhaust conduit in fluid communication with the diesel engine via an exhaust manifold,
the layered diesel oxidation catalyst as defined above, wherein the carrier substrate is a wall-flow substrate or a flow through substrate, and
one or more of the following in fluid communication with the layered diesel oxidation catalyst composite: a catalyzed soot filter (CSF), a selective catalytic reduction (SCR) article, a NOx storage and reduction (NSR) catalytic article.

Still further provided is a method of treating a diesel exhaust stream, the method comprising contacting the exhaust stream with the layered diesel oxidation catalyst as defined above.

One or more embodiments of the invention are directed to layered diesel oxidation catalysts (DOC) comprising a carrier substrate and a diesel oxidation catalytic material. The diesel oxidation catalytic material comprising a first layer and a second layer. The first layer is located on the carrier substrate and comprises palladium impregnated on a support material comprising ceria in an amount of at least 45 weight-% based on the total weight of the support material, and optionally comprising platinum. The second layer is located on the first layer and comprises palladium and platinum each impregnated on a support material comprising a metal oxide. The platinum to palladium weight ratio of the first layer is lower than the platinum to palladium weight ratio of the second layer.

In some embodiments, the platinum to palladium weight ratio of the first layer is in the range of from 0:1 to 1.1:1.

In one or more embodiments, the platinum to palladium weight ratio of the second layer is in the range of from 1:0 to 1.1:1.

In detailed embodiments, the ratio of the platinum to palladium weight ratio of the first layer to the platinum to palladium weight ratio of the second layer is lower than or equal to 0.9.

In some embodiments, the support material of the first layer comprises ceria in an amount of at least 65 weight-% based on the total weight of the support material.

In one or more embodiments, the support material of the first layer further comprises zirconia and/or alumina. In detailed embodiments, the support material of the first layer further comprises a modifier selected from the group consisting of $La_2O_3$, $Pr_6O_{11}$, $HfO_2$, $Y_2O_3$, $Yb_2O_3$, $YbO$, $Nd_2O_3$, $NdO$, $WO_3$, $SiO_2$, $TiO_2$ and combinations of two or more thereof.

In some embodiments, the support material of the second layer comprises a metal oxide selected from the group consisting of alumina, zirconia, silica, titania, silica-alumina, alumina-zirconia, titania-silica, titania-zirconia, titania-alumina, and combinations of two or more thereof. In detailed embodiments, the second layer has a ceria content of not more than 5 weight-%.

In some embodiments, the first layer comprises palladium in an amount of from 6 to 60 $g/ft^3$.

In one or more embodiments, the first layer comprises platinum in an amount of from 15 to 40 $g/ft^3$.

In some embodiments, the second layer comprises platinum and palladium in a total amount of from 30 to 180 $g/ft^3$.

In some embodiments, the diesel oxidation catalytic material comprises platinum and palladium in a total amount of from 30 to 240 $g/ft^3$ based on.

In one or more embodiments, the second layer further comprises a hydrocarbon storage compound.

Some embodiments further comprise an undercoat layer located between the carrier substrate and the first layer. In detailed embodiments, the undercoat layer comprises alumina.

In one or more embodiments, the carrier substrate is a flow-through substrate or a wall flow substrate. In detailed embodiments, the carrier substrate comprises a material selected from the group consisting of cordierite, cordierite-alumina, silicon nitride, silicon carbide, zircon mullite, spodumene, alumina-silica magnesia, zircon silicate, sillimanite, magnesium silicate, zircon, petalite, alumina, alumosilicate and combinations of two or more thereof.

One or more embodiments further comprises a third layer located on the second layer. The third layer comprises palladium impregnated on a support material comprising ceria in an amount of at least 45 weight-% based on the total weight of the support material, and optionally comprising platinum. The platinum to palladium weight ratio of the third layer is lower than the platinum to palladium weight ratio of the second layer. In detailed embodiments, the ratio of the platinum to palladium weight ratio of the third layer to the platinum to palladium weight ratio of the second layer is lower than or equal to 0.9. In specific embodiments, wherein the support material of the third layer comprises ceria in an amount of at least 65 weight-% based on the total weight of the support material. In some embodiments, the support material of the third layer further comprises zirconia and/or alumina.

In one or more embodiments, the support material of the third layer further comprises a modifier selected from the group consisting of $La_2O_3$, $Pr_6O_{11}$, $HfO_2$, $Y_2O_3$, $Yb_2O_3$, $YbO$, $Nd_2O_3$, $NdO$, $WO_3$, $SiO_2$, $TiO_2$ and combinations of two or more thereof.

In some embodiments, the third layer comprises palladium in an amount of from 2 to 30 g/ft$^3$. In detailed embodiments, the third layer comprises platinum in an amount of from 4 to 16 g/ft$^3$.

In some embodiments, the third layer further comprises a hydrocarbon storage compound.

Additional embodiments of the invention are directed to systems for treating a gaseous exhaust stream from a diesel engine. The systems comprise the layered diesel oxidation catalyst described and claimed, an exhaust conduit in fluid communication with the diesel engine via an exhaust manifold, and one or more of the following in fluid communication with the layered diesel oxidation catalyst composite: a catalyzed soot filter (CSF), a selective catalytic reduction (SCR) article, a NOx storage and reduction (NSR) catalytic article.

Further embodiments of the invention are directed to processes for preparing a layered diesel oxidation catalyst. A carrier substrate is provided. Optionally, an undercoat layer is applied to the carrier substrate. A first layer is applied on the carrier substrate or the undercoat layer, the first layer comprising palladium impregnated on a support material comprising ceria in an amount of at least 45 weight-% based on the total weight of the support material, and optionally comprising platinum. A second layer is applied on the first layer. The second layer comprises palladium and platinum each impregnated on a support material comprising a metal oxide, wherein the platinum to palladium weight ratio of the first layer is lower than the platinum to palladium weight ratio of the second layer. Optionally, a third layer is applied on the second layer. The third layer comprises palladium impregnated on a support material comprising ceria in an amount of at least 45 weight-% based on the total weight of the support material, and optionally comprising platinum. The platinum to palladium weight ratio of the third layer is lower than the platinum to palladium weight ratio of the second layer.

One or more embodiments of the invention are directed to systems for treating a gaseous exhaust stream of a diesel engine. The systems comprise an exhaust conduit in fluid communication with the diesel engine via an exhaust manifold. A layered diesel oxidation catalyst as described and claimed herein. The carrier substrate of the diesel oxidation catalyst is a wall-flow substrate or a flow-through substrate. One or more of the following is in fluid communication with the layered diesel oxidation catalyst composite: a catalyzed soot filter (CSF), a selective catalytic reduction (SCR) article, a NOx storage and reduction (NSR) catalytic article.

Some embodiments, of the system for treating a gaseous exhaust stream include a catalyzed soot filter and the layered diesel oxidation catalyst is located upstream of the catalyzed soot filter.

BRIEF DESCRIPTION OF THE DRAWINGS

FIG. 1 shows CO light-off curves obtained from the treatment of diesel exhaust using the DOCs according to Samples A), B), C), D) and E). The x-axis of the diagram denoted "Catalyst Inlet T/° C." shows the respective catalyst inlet temperature in ° C. and ranges from 120° C. to 280° C., whereas the y-axis denoted "CO-Eff/%" shows the corresponding efficacy of CO oxidation to CO$_2$ in % and ranges from 0% to 100%. The values for Sample A) according to the invention are displayed in a solid line with bullets, the values for Sample B) according to the invention are displayed in a dotted line, the values for Sample C) according to the invention are displayed in a dashed line, the values for Sample D) not according to the invention are displayed in a solid line, and the values for Sample E) not according to the invention are displayed in a solid line with crosses.

FIG. 2 shows HC light-off curves obtained from the treatment of diesel exhaust using the DOCs according to Samples A), B), C), D) and E). The x-axis of the diagram denoted "Catalyst Inlet T/° C." shows the respective catalyst inlet temperature in ° C. and ranges from 120° C. to 280° C., whereas the y-axis denoted "HC-Eff/%" shows the corresponding efficacy of HC oxidation to CO$_2$ in % and ranges from 0% to 100%. The values for Sample A) according to the invention are displayed in a solid line with bullets, the values for Sample B) according to the invention are displayed in a dotted line, the values for Sample C) according to the invention are displayed in a dashed line, the values for Sample D) not according to the invention are displayed in a solid line, and the values for Sample E) not according to the invention are displayed in a solid line with crosses.

DETAILED DESCRIPTION

The present invention relates to a layered diesel oxidation catalyst (DOC) comprising:
a) a carrier substrate;
b) a diesel oxidation catalytic material comprising
b1) a first layer located on the carrier substrate, the first layer comprising palladium impregnated on a support material comprising ceria in an amount of at least 45 weight-% based on the total weight of the support material, and optionally comprising platinum;
b2) a second layer located on the first layer, the second layer comprising palladium and platinum each impregnated on a support material comprising a metal oxide;
wherein the platinum to palladium weight ratio of the first layer is lower than the platinum to palladium weight ratio of the second layer.

Generally, there are no specific restrictions as far as the platinum to palladium weight ratio of the first layer is concerned provided that the platinum to palladium weight ratio of the first layer is lower than the platinum to palladium weight ratio of the second layer. Preferably, the platinum to palladium weight ratio of the first layer is in the range of from 0:1 to 1.1:1.

Therefore, the present invention also relates to the diesel oxidation catalyst as defined above, wherein the platinum to palladium weight ratio of the first layer is in the range of from 0:1 to 1.1:1.

Likewise, there are no specific restrictions as far as the platinum to palladium weight ratio of the second layer is concerned provided that the platinum to palladium weight ratio of the first layer is lower than the platinum to palladium weight ratio of the second layer. Preferably, the platinum to palladium weight ratio of the second layer is in the range of from 1:0 to 1.1:1, more preferably in the range of from 10:1 to 1.5:1, even more preferably in the range of from 5:1 to 2:1, most preferably in a ratio of 2:1, provided that the platinum to palladium weight ratio of the first layer is lower than the platinum to palladium weight ratio of the second layer.

Therefore, the present invention also relates to the diesel oxidation catalyst as defined above, wherein the platinum to palladium weight ratio of the second layer is in the range of from 1:0 to 1.1:1, preferably in the range of from 10:1 to 1.5:1, more preferably in the range of from 5:1 to 2:1, most preferably in a ratio of 2:1.

According to the present invention, the platinum to palladium weight ratio of the first layer is lower than the platinum to palladium weight ratio of the second layer. Preferably, the ratio of the platinum to palladium weight ratio of the first layer to the platinum to palladium weight ratio of the second layer is lower than or equal to 0.9.

Therefore, the present invention also relates to the diesel oxidation catalyst as defined above, wherein the ratio of the platinum to palladium weight ratio of the first layer to the platinum to palladium weight ratio of the second layer is lower than or equal to 0.9.

According to the present invention, the first layer comprises palladium impregnated on a support material comprising ceria in an amount of at least 45 weight-% based on the total weight of the support material. Preferably, the support material of the first layer comprises ceria in an amount of at least 65 weight-%, more preferably at least 85 weight-%, even more preferably at least 95 weight-%, most preferably 100 weight-% based on the total weight of the support material.

Therefore, the present invention relates to the diesel oxidation catalyst as defined above, wherein the support material of the first layer comprises ceria in an amount of at least 65 weight-%, preferably at least 85 weight-%, more preferably at least 95 weight-%, most preferably 100 weight-% based on the total weight of the support material.

Preferably, the support material of the first layer further comprises zirconia and/or alumina.

Therefore, the present invention relates to the diesel oxidation catalyst as defined above, wherein the support material of the first layer further comprises zirconia and/or alumina.

Preferably, the support material of the first layer further comprises a modifier selected from the group consisting of $La_2O_3$, $Pr_6O_{11}$, $HfO_2$, $Y_2O_3$, $Yb_2O_3$, YbO, $Nd_2O_3$, NdO, $WO_3$, $SiO_2$, $TiO_2$ and combinations of two or more thereof.

Therefore, the present invention relates to the diesel oxidation catalyst as defined above, wherein the support material of the first layer further comprises a modifier selected from the group consisting of $La_2O_3$, $Pr_6O_{11}$, $HfO_2$, $Y_2O_3$, $Yb_2O_3$, YbO, $Nd_2O_3$, NdO, $WO_3$, $SiO_2$, $TiO_2$ and combinations of two or more thereof.

Most preferably, the support material of the first layer comprises a ceria-zirconia material consisting of $CeO_2$: 45 wt %, $ZrO_2$: 43.5 wt %, $La_2O_3$: 8 wt %, $Pr_6O_{11}$: 2 wt %, and $HfO_2$: 1.5 wt %.

According to the present invention, the support material of the second layer may comprise a metal oxide. Preferably, the support material of the second layer comprises a metal oxide selected from the group consisting of alumina, zirconia, silica, titania, silica-alumina, alumina-zirconia, titania-silica, titania-zirconia, titania-alumina, and combinations of two or more thereof.

Therefore, the present invention relates to the diesel oxidation catalyst as defined above, wherein the support material of the second layer comprises a metal oxide selected from the group consisting of alumina, zirconia, silica, titania, silica-alumina, alumina-zirconia, titania-silica, titania-zirconia, titania-alumina, and combinations of two or more thereof.

According to the present invention, it is further preferred that the metal oxide of the second layer comprises alumina, more preferably gamma alumina or activated alumina, such as gamma or eta alumina. Preferably, the activated alumina has a specific surface area, determined according to BET surface area measurements, of from 60 to 300 $m^2/g$, preferably from 90 to 200 $m^2/g$, mostly preferred from 100 to 180 $m^2/g$.

It is further preferred that the second layer has a ceria content of not more than 5 weight-%, preferably not more than 1 weight-%, more preferably not more than 0.1 weight-%.

Therefore, the present invention relates to the diesel oxidation catalyst as defined above, wherein the second layer has a ceria content of not more than 5 weight-%, preferably not more than 1 weight-%, more preferably not more than 0.1 weight-%.

Generally, there are no specific restrictions as far as the palladium content of the first layer is concerned provided that the platinum to palladium weight ratio of the first layer is lower than the platinum to palladium weight ratio of the second layer. Preferably, the first layer comprises palladium in an amount of from 6 to 60 $g/ft^3$.

Therefore, the present invention relates to the diesel oxidation catalyst as defined above, wherein the first layer comprises palladium in an amount of from 6 to 60 $g/ft^3$.

Generally, there are no specific restrictions as far as the platinum content of the first layer is concerned provided that the platinum to palladium weight ratio of the first layer is lower than the platinum to palladium weight ratio of the second layer. Preferably, the first layer comprises platinum in an amount of from 15 to 40 $g/ft^3$.

Therefore, the present invention relates to the diesel oxidation catalyst as defined above, wherein the first layer comprises platinum in an amount of from 15 to 40 $g/ft^3$.

Generally, there are no specific restrictions as far as the total content of platinum and palladium of the second layer is concerned provided that the platinum to palladium weight ratio of the first layer is lower than the platinum to palladium weight ratio of the second layer. Preferably, the second layer comprises platinum and palladium in a total amount of from 30 to 180 $g/ft^3$.

Therefore, the present invention relates to the diesel oxidation catalyst as defined above, wherein the second layer comprises platinum and palladium in a total amount of from 30 to 180 $g/ft^3$.

While there are no specific restrictions as far as the total amount of platinum and palladium of the diesel oxidation catalytic material is concerned provided that the platinum to palladium weight ratio of the first layer is lower than the platinum to palladium weight ratio of the second layer, it is preferred that the diesel oxidation catalytic material comprises platinum and palladium in a total amount of from 30 to 240 $g/ft^3$.

Therefore, the present invention relates to the diesel oxidation catalyst as defined above, wherein the diesel oxidation catalytic material comprises platinum and palladium in a total amount of from 30 to 240 $g/ft^3$.

Preferably, the second layer further comprises a hydrocarbon storage compound, preferably a zeolite. If present, the second layer comprises the hydrocarbon storage compound in a total amount of from 0.1 to 1 $g/ft^3$, preferably of from 0.3 to 0.8 $g/ft^3$, more preferably in an amount of 0.5 $g/ft^3$.

Therefore, the present invention relates to the diesel oxidation catalyst as defined above, wherein the second layer further comprises a hydrocarbon storage compound, preferably a zeolite.

Typically, any structure types of zeolites/aluminosilicates can be used, such as structure types of ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAN, CAS, SCO, CFI, SGF, CGS, CHA, CHI, CLO, CON, CZP, DAC, DDR, DFO, DFT, DOH, DON, EAB, EDI, EMT, EON, EPI, ERI, ESV, ETR, EUO, FAU, FER, FRA, GIS, GIU, GME, GON, GOO, HEU, IFR, IHW, ISV, ITE, ITH, ITW, IWR, IWW, JBW, KFI, LAU, LEV, LIO, LIT, LOS, LOV, LTA, LTL, LTN, MAR, MAZ, MEI, MEL, MEP, MER, MFI, MFS, MON, MOR, MOZ, MSO, MTF, MTN, MTT, MTW, MWW, NAB, NAT, NES, NON, NPO, NSI, OBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN, SFO, SGT, SOD, SOS, SSY, STF, STI, STT, TER, THO, TON, TSC, UEI, UFI, UOZ, USI, UTL, VET, VFI, VNI, VSV, WIE, WEN, YUG, ZON or a mixture of one or more thereof.

The zeolite can be a natural or synthetic zeolite such as faujasite, chabazite, clinoptilolite, mordenite, silicalite, zeolite X, zeolite Y, ultrastable zeolite Y, ZSM-5 zeolite, ZSM-12 zeolite, SSZ-3 zeolite, SAPO 5 zeolite, offretite, or a beta zeolite. Preferred zeolite materials have a high silica to alumina ratio. The zeolites may have a silica:alumina molar ratio of from at least 25:1, preferably at least 50:1, with useful ranges of from 25:1 to 1000:1, 50:1 to 500:1 as well as 25:1 to 300:1, from 100:1 to 250:1, or alternatively from 35:1 to 180:1 is also exemplified. Preferred zeolites include ZSM, Y and beta zeolites. A particularly preferred beta zeolite is of the type disclosed in U.S. Pat. No. 6,171,556. The zeolite can be present in its H-Form and/or its Na-Form. Further, the zeolite can be metal-doped.

It is further preferred that the diesel oxidation catalyst further comprises an undercoat layer located between the carrier substrate and the first layer, the undercoat layer preferably comprising alumina, more preferably gamma-alumina.

Therefore, the present invention relates to the diesel oxidation catalyst as defined above further comprising an undercoat layer located between the carrier substrate and the first layer, the undercoat layer preferably comprising alumina, more preferably gamma-alumina.

According to the present invention, the carrier substrate may be a flow-through substrate or a wall flow substrate.

Therefore, the present invention relates to the diesel oxidation catalyst as defined above, wherein the carrier substrate is a flow-through substrate or a wall flow substrate.

Wall flow substrates useful for the diesel oxidation catalysts of the present invention have a plurality of fine, substantially parallel flow passages extending along the longitudinal axis of the substrate. Each passage is blocked at one end of the substrate body, with alternate passages blocked at opposite end-faces. Such monolithic carriers may contain up to about 400 flow passages (or "cells") per square inch ((2.54 cm)$^2$) of cross section, although far fewer may be used. For example, the carrier may have from 7 to 400, preferably from 100 to 400, cells per square inch ("cpsi"). The cells can have cross sections that are rectangular, square, circular, oval, triangular, hexagonal, or are of other polygonal shapes.

Preferred wall flow substrates are composed of ceramic-like materials such as cordierite, alpha-alumina, silicon carbide, silicon nitride, zirconia, mullite, spodumene, alumina-silica-magnesia or zirconium silicate, or of refractory metals such as stainless steel. Preferred wall flow substrates are formed from cordierite and silicon carbide. Such materials are able to withstand the environment, particularly high temperatures, encountered in treating the exhaust streams. Ceramic wall flow substrates are typically formed of a material having a porosity of about 40 to 70. The term "porosity" as used in this context is understood as being determined according to mercury porosity measurement according to DIN 66133. According to the present invention, wall flow substrates are preferred having a porosity in the range from 38 to 75.

It is further preferred that the carrier substrate comprises a material selected from the group consisting of cordierite, cordierite-alumina, silicon nitride, silicon carbide, zircon mullite, spodumene, alumina-silica magnesia, zircon silicate, sillimanite, magnesium silicate, zircon, petalite, alumina, alumosilicate and combinations of two or more thereof.

Therefore, the present invention relates to the diesel oxidation catalyst as defined above, wherein the carrier substrate comprises a material selected from the group consisting of cordierite, cordierite-alumina, silicon nitride, silicon carbide, zircon mullite, spodumene, alumina-silica magnesia, zircon silicate, sillimanite, magnesium silicate, zircon, petalite, alumina, alumosilicate and combinations of two or more thereof.

Generally, there are no specific restrictions as far as the number of layers of the layered diesel oxidation catalyst is concerned. With the proviso that the diesel oxidation catalytic material comprises at least b1) a first layer located on the carrier substrate, the first layer comprising palladium impregnated on a support material comprising ceria in an amount of at least 45 weight-% based on the total weight of the support material, and optionally comprising platinum; and b2) a second layer located on the first layer, the second layer comprising palladium and platinum each impregnated on a support material comprising a metal oxide;

wherein the platinum to palladium weight ratio of the first layer is lower than the platinum to palladium weight ratio of the second layer, the number of layers of the layered diesel oxidation catalyst can be varied. Preferably, the layered diesel oxidation catalyst further comprises b3) a third layer located on the second layer, the third layer comprising palladium impregnated on a support material comprising ceria in an amount of at least 45 weight-% based on the total weight of the support material, and optionally comprising platinum, wherein the platinum to palladium weight ratio of the third layer is lower than the platinum to palladium weight ratio of the second layer.

Therefore, the present invention relates to the diesel oxidation catalyst as defined above, further comprising b3) a third layer located on the second layer, the third layer comprising palladium impregnated on a support material comprising ceria in an amount of at least 45 weight-% based on the total weight of the support material, and optionally comprising platinum, wherein the platinum to palladium weight ratio of the third layer is lower than the platinum to palladium weight ratio of the second layer.

According to the present invention, if a third layer is present, the platinum to palladium weight ratio of the third layer is lower than the platinum to palladium weight ratio of the second layer. Preferably, the ratio of the platinum to palladium weight ratio of the third layer to the platinum to palladium weight ratio of the second layer is lower than or equal to 0.9.

Therefore, the present invention also relates to the diesel oxidation catalyst as defined above, wherein the ratio of the platinum to palladium weight ratio of the third layer to the platinum to palladium weight ratio of the second layer is lower than or equal to 0.9.

According to the present invention, if a third layer is present, the third layer comprises palladium impregnated on a support material comprising ceria in an amount of at least 45 weight-% based on the total weight of the support material. Preferably, the support material of the third layer comprises ceria in an amount of at least 65 weight-%, more preferably at least 85 weight-%, most preferably at least 95 weight-% based on the total weight of the support material.

Therefore, the present invention relates to the diesel oxidation catalyst as defined above, wherein the support material of the third layer comprises ceria in an amount of at least 65 weight-%, preferably at least 85 weight-%, more preferably at least 95 weight-% based on the total weight of the support material.

Preferably, the support material of the third layer further comprises zirconia and/or alumina.

Therefore, the present invention relates to the diesel oxidation catalyst as defined above, wherein the support material of the third layer further comprises zirconia and/or alumina.

Preferably, the support material of the third layer further comprises a modifier selected from the group consisting of $La_2O_3$, $Pr_6O_{11}$, $HfO_2$, $Y_2O_3$, $Yb_2O_3$, YbO, $Nd_2O_3$, NdO, $WO_3$, $SiO_2$, $TiO_2$ and combinations of two or more thereof.

Therefore, the present invention relates to the diesel oxidation catalyst as defined above, wherein the support material of the third layer further comprises a modifier selected from the group consisting of $La_2O_3$, $Pr_6O_{11}$, $HfO_2$, $Y_2O_3$, $Yb_2O_3$, YbO, $Nd_2O_3$, NdO, $WO_3$, $SiO_2$, $TiO_2$ and combinations of two or more thereof.

Most preferably, the support material of the third layer comprises a ceria-zirconia material consisting of $CeO_2$: 45 wt %, $ZrO_2$: 43.5 wt %, $La_2O_3$: 8 wt %, $Pr_6O_{11}$: 2 wt %, and $HfO_2$: 1.5 wt %.

Generally, there are no specific restrictions as far as the palladium content of the third layer is concerned provided that the platinum to palladium weight ratio of the third layer is lower than the platinum to palladium weight ratio of the second layer. Preferably, the third layer comprises palladium in an amount of from 2 to 30 $g/ft^3$.

Therefore, the present invention relates to the diesel oxidation catalyst as defined above, wherein the third layer comprises palladium in an amount of from 2 to 30 $g/ft^3$.

Generally, there are no specific restrictions as far as the platinum content of the third layer is concerned provided that the platinum to palladium weight ratio of the third layer is lower than the platinum to palladium weight ratio of the second layer. Preferably, the third layer comprises platinum in an amount of from 4 to 16 $g/ft^3$.

Therefore, the present invention relates to the diesel oxidation catalyst as defined above, wherein the third layer comprises platinum in an amount of from 4 to 16 $g/ft^3$.

Preferably, the third layer further comprises a hydrocarbon storage compound, preferably a zeolite. If present, the third layer comprises the hydrocarbon storage compound in a total amount of from 0.1 to 1 $g/ft^3$, preferably of from 0.3 to 0.8 $g/ft^3$, more preferably in an amount of 0.5 $g/ft^3$.

Therefore, the present invention relates to the diesel oxidation catalyst as defined above, wherein the third layer further comprises a hydrocarbon storage compound, preferably a zeolite.

Typically, any structure types of zeolites/aluminosilicates can be used. In this respect, reference is made to the structure types mentioned for the second layer.

The layered diesel oxidation catalyst of the present invention can be used in an integrated system for treating a gaseous exhaust stream of a diesel engine.

Therefore, the present invention also relates to the layered diesel oxidation catalyst as defined above comprised in a system for treating of a gaseous exhaust stream of a diesel engine, the system further comprising:
an exhaust conduit in fluid communication with the diesel engine via an exhaust manifold, and
one or more of the following in fluid communication with the layered diesel oxidation catalyst composite: a catalyzed soot filter (CSF), a selective catalytic reduction (SCR) article, a NOx storage and reduction (NSR) catalytic article.

Each of the layers of the diesel catalytic material according to the present invention is formed from a washcoat composition that contains the respective support material as described above. Other additives such as binders and stabilizers can also be included in the washcoat composition. As disclosed in U.S. Pat. No. 4,727,052, porous support materials, such as activated alumina, can be thermally stabilized to retard undesirable alumina phase transformations from gamma to alpha at elevated temperatures. Stabilizers can be selected from at alkaline earth metal components selected from the group consisting of magnesium, barium, calcium and strontium, preferably strontium and barium. When present, stabilizer materials are added at from about 0.01 $g/in^3$ ($g/(2.54 cm)^3$) to 0.15 $g/in^3$ ($g/(2.54 cm)^3$) in the coating.

The first layer is disposed on the surface of the carrier substrate or the undercoat layer. The second layer is disposed on the first layer which had been applied onto the surface of carrier substrate or the undercoat layer. Further, it is conceivable that a third layer is disposed on the second layer. It is to be understood that a given layer may partially permeate the substrate or the layer onto which it is applied.

For the preparation of the washcoat compositions mentioned above, it is preferred to disperse a suitable Pt and/or Pd component precursor on a suitable support material as described hereinabove. More preferably, a water-soluble or water-dispersible Pt and/or Pd component precursor is/are impregnated on a suitable support material, followed by drying and fixing steps. Suitable Pt and/or Pd component precursors include, for example, potassium platinum chloride, ammonium platinum thiocyanate, amine-solubilized platinum hydroxide, chloroplatinic acid, palladium nitrate, and the like. Other suitable precursors will be apparent to those of skill in the art. The impregnated support material is preferably dried with the Pt and/or Pd component fixed thereon. Generally, drying temperatures are in the range from 60 to 250° C., preferably from 90 to 210° C., more preferably from 100 to 150° C. Drying can be carried out in any suitable atmosphere, with $N_2$ or air being preferred. After drying, it is preferred to finally fix the Pt and/or Pd component on the support material by suitable calcination and/or other suitable methods such as treatment with acetic acid. In general, any method resulting in the Pt and/or Pd component being in water-insoluble form is suitable. Generally, calcination temperatures are in the range from 250 to 800° C., preferably from 350 to 700° C., more preferably from 400 to 600° C. Calcination can be carried out in any suitable atmosphere, with $N_2$ or air being preferred. By, for example, calcination, the catalytically active elemental Pt and/or Pd or the respective oxide is obtained. It is to be understood that the term "platinum" or "palladium" present in the finally obtained layered diesel oxidation catalyst as used in the context of the present invention relates to the Pt and/or Pd component in the form of the catalytically active elemental Pt and/or Pd, or the oxide thereof, or the mixture of elemental Pt and/or Pd and the oxide thereof.

Therefore, the present invention also relates to a process for the preparation of the layered diesel oxidation catalyst as defined above, comprising the steps of
(i) providing a carrier substrate;
(ii) optionally applying an undercoat layer on the carrier substrate;
(iii) applying a first layer on the carrier substrate or the undercoat layer, the first layer comprising palladium impregnated on a support material comprising ceria in an amount of at least 45 weight-% based on the total weight of the support material, and optionally comprising platinum;
(iv) applying a second layer on the first layer, the second layer comprising palladium and platinum each impregnated on a support material comprising a metal oxide, wherein the platinum to palladium weight ratio of the first layer is lower than the platinum to palladium weight ratio of the second layer;
(v) optionally applying a third layer on the second layer, the third layer comprising palladium impregnated on a support material comprising ceria in an amount of at least 45 weight-% based on the total weight of the support material, and optionally comprising platinum, wherein the platinum to palladium weight ratio of the third layer is lower than the platinum to palladium weight ratio of the second layer.

Further, the present invention relates to a system for treating of a gaseous exhaust stream of a diesel engine, the system comprising:
an exhaust conduit in fluid communication with the diesel engine via an exhaust manifold,
the layered diesel oxidation catalyst as described above, wherein the carrier substrate is a wall-flow substrate or a flow through substrate, and
one or more of the following in fluid communication with the layered diesel oxidation catalyst composite: a catalyzed soot filter (CSF), a selective catalytic reduction (SCR) article, a NOx storage and reduction (NSR) catalytic article.

Preferably, in this system, if present, the layered diesel oxidation catalyst is located upstream of the catalyzed soot filter.

Therefore, the present invention relates to a system for treating a gaseous exhaust stream of a diesel engine as defined above comprising a catalyzed soot filter, wherein the layered diesel oxidation catalyst is located upstream of the catalyzed soot filter.

A suitable SCR article for use in the exhaust conduit is typically able to catalyze the reaction of $O_2$ with any excess $NH_3$ to $N_2$ and $H_2O$, so that $NH_3$ is not emitted to the atmosphere. Suitable SCR articles are described, for instance, in U.S. Pat. No. 4,961,917 and U.S. Pat. No. 5,516,497. Suitable SCR articles include one or both of an iron and a copper promoter typically present in a zeolite in an amount of from about 0.1 to 30 percent by weight, preferably from about 1 to 5 percent by weight, of the total weight of promoter plus zeolite. Typical zeolites may exhibit a CHA framework structure.

Finally, the present invention relates to a method of treating a gaseous exhaust stream of a diesel engine, said method comprising contacting the exhaust stream with the layered diesel oxidation catalyst as defined above.

The present invention includes the following embodiments, wherein these include the specific combinations of embodiments as indicated by the respective interdependencies defined therein:

1. A layered diesel oxidation catalyst (DOC) comprising:
    a) a carrier substrate;
    b) a diesel oxidation catalytic material comprising
    b1) a first layer located on the carrier substrate, the first layer comprising palladium impregnated on a support material comprising ceria in an amount of at least 45 weight-% based on the total weight of the support material, and optionally comprising platinum;
    b2) a second layer located on the first layer, the second layer comprising palladium and platinum each impregnated on a support material comprising a metal oxide;
    wherein the platinum to palladium weight ratio of the first layer is lower than the platinum to palladium weight ratio of the second layer.
2. The layered diesel oxidation catalyst according to embodiment 1, wherein the platinum to palladium weight ratio of the first layer is in the range of from 0:1 to 1.1:1.
3. The layered diesel oxidation catalyst according to embodiment 1 or 2, wherein the platinum to palladium weight ratio of the second layer is in the range of from 1:0 to 1.1:1, preferably in the range of from 10:1 to 1.5:1, more preferably in the range of from 5:1 to 2:1, most preferably in a ratio of 2:1.
4. The layered diesel oxidation catalyst according to any of embodiments 1 to 3, wherein the ratio of the platinum to palladium weight ratio of the first layer to the platinum to palladium weight ratio of the second layer is lower than or equal to 0.9.
5. The layered diesel oxidation catalyst according to any of embodiments 1 to 4, wherein the support material of the first layer comprises ceria in an amount of at least 65 weight-%, preferably at least 85 weight-%, more preferably at least 95 weight-% based on the total weight of the support material.
6. The layered diesel oxidation catalyst according to any of embodiment 1 to 5, wherein the support material of the first layer further comprises zirconia and/or alumina.
7. The layered diesel oxidation catalyst according to any of embodiments 1 to 6, wherein the support material of the first layer further comprises a modifier selected from the group consisting of $La_2O_3$, $Pr_6O_{11}$, $HfO_2$, $Y_2O_3$, $Yb_2O_3$, $YbO$, $Nd_2O_3$, $NdO$, $WO_3$, $SiO_2$, $TiO_2$ and combinations of two or more thereof.
8. The layered diesel oxidation catalyst according to any of embodiments 1 to 7, wherein the support material of the second layer comprises a metal oxide selected from the group consisting of alumina, zirconia, silica, titania, silica-alumina, alumina-zirconia, titania-silica, titania-zirconia, titania-alumina, and combinations of two or more thereof.
9. The layered diesel oxidation catalyst according to any of embodiments 1 to 8, wherein the second layer has a ceria content of not more than 5 weight-%, preferably not more than 1 weight-%, more preferably not more than 0.1 weight-%.
10. The layered diesel oxidation catalyst according to any of embodiments 1 to 9, wherein the first layer comprises palladium in an amount of from 6 to 60 g/ft$^3$.
11. The layered diesel oxidation catalyst composite according to any of embodiments 1 to 10, wherein the first layer comprises platinum in an amount of from 15 to 40 g/ft$^3$.
12. The layered diesel oxidation catalyst according to any of embodiments 1 to 11, wherein the second layer comprises platinum and palladium in a total amount of from 30 to 180 g/ft$^3$.
13. The layered diesel oxidation catalyst according to any of embodiments 1 to 12, wherein the diesel oxidation catalytic material comprises platinum and palladium in a total amount of from 30 to 240 g/ft$^3$ based on.

14. The layered diesel oxidation catalyst according to any of embodiments 1 to 13, wherein the second layer further comprises a hydrocarbon storage compound, preferably a zeolite.

15. The layered diesel oxidation catalyst according to any of embodiments 1 to 14, further comprising an undercoat layer located between the carrier substrate and the first layer.

16. The layered diesel oxidation catalyst according to embodiments 15, wherein the undercoat layer comprises alumina.

17. The layered diesel oxidation catalyst according to any of embodiments 1 to 16, wherein the carrier substrate is a flow-through substrate or a wall flow substrate.

18. The layered diesel oxidation catalyst according to any of embodiments 1 to 17, wherein the carrier substrate comprises a material selected from the group consisting of cordierite, cordierite-alumina, silicon nitride, silicon carbide, zircon mullite, spodumene, alumina-silica magnesia, zircon silicate, sillimanite, magnesium silicate, zircon, petalite, alumina, alumosilicate and combinations of two or more thereof.

19. The layered diesel oxidation catalyst according to any of embodiments 1 to 18, further comprising
b3) a third layer located on the second layer, the third layer comprising palladium impregnated on a support material comprising ceria in an amount of at least 45 weight-% based on the total weight of the support material, and optionally comprising platinum,
wherein the platinum to palladium weight ratio of the third layer is lower than the platinum to palladium weight ratio of the second layer.

20. The layered diesel oxidation catalyst according to embodiment 19, wherein the ratio of the platinum to palladium weight ratio of the third layer to the platinum to palladium weight ratio of the second layer is lower than or equal to 0.9.

21. The layered diesel oxidation catalyst according to embodiment 19 or 20, wherein the support material of the third layer comprises ceria in an amount of at least 65 weight-%, preferably at least 85 weight-%, more preferably at least 95 weight-% based on the total weight of the support material.

22. The layered diesel oxidation catalyst according to any of embodiments 19 to 21, wherein the support material of the third layer further comprises zirconia and/or alumina.

23. The layered diesel oxidation catalyst according to any of embodiments 19 to 22, wherein the support material of the third layer further comprises a modifier selected from the group consisting of $La_2O_3$, $Pr_6O_{11}$, $HfO_2$, $Y_2O_3$, $Yb_2O_3$, YbO, $Nd_2O_3$, NdO, $WO_3$, $SiO_2$, $TiO_2$ and combinations of two or more thereof.

24. The layered diesel oxidation catalyst according to any of embodiments 19 to 23, wherein the third layer comprises palladium in an amount of from 2 to 30 g/ft$^3$.

25. The layered diesel oxidation catalyst according to any of embodiments 19 to 24, wherein the third layer comprises platinum in an amount of from 4 to 16 g/ft$^3$.

26. The layered diesel oxidation catalyst according to any of embodiments 19 to 25, wherein the third layer further comprises a hydrocarbon storage compound, preferably a zeolite.

27. The layered diesel oxidation catalyst according to any of embodiments 1 to 26 comprised in a system for treating of a gaseous exhaust stream of a diesel engine, the system further comprising:
an exhaust conduit in fluid communication with the diesel engine via an exhaust manifold, and
one or more of the following in fluid communication with the layered diesel oxidation catalyst composite: a catalyzed soot filter (CSF), a selective catalytic reduction (SCR) article, a NOx storage and reduction (NSR) catalytic article.

28. A process for the preparation of the layered diesel oxidation catalyst according to any of embodiments 1 to 26, comprising the steps of
(i) providing a carrier substrate;
(ii) optionally applying an undercoat layer on the carrier substrate;
(iii) applying a first layer on the carrier substrate or the undercoat layer, the first layer comprising palladium impregnated on a support material comprising ceria in an amount of at least 45 weight-% based on the total weight of the support material, and optionally comprising platinum;
(iv) applying a second layer on the first layer, the second layer comprising palladium and platinum each impregnated on a support material comprising a metal oxide, wherein the platinum to palladium weight ratio of the first layer is lower than the platinum to palladium weight ratio of the second layer;
(v) optionally applying a third layer on the second layer, the third layer comprising palladium impregnated on a support material comprising ceria in an amount of at least 45 weight-% based on the total weight of the support material, and optionally comprising platinum,
wherein the platinum to palladium weight ratio of the third layer is lower than the platinum to palladium weight ratio of the second layer.

29. A system for treating a gaseous exhaust stream of a diesel engine, the system comprising:
an exhaust conduit in fluid communication with the diesel engine via an exhaust manifold,
the layered diesel oxidation catalyst according to any of embodiments 1 to 26, wherein the carrier substrate is a wall-flow substrate or a flow through substrate, and one or more of the following in fluid communication with the layered diesel oxidation catalyst composite: a catalyzed soot filter (CSF), a selective catalytic reduction (SCR) article, a NOx storage and reduction (NSR) catalytic article.

30. The system according to embodiment 29 comprising a catalyzed soot filter, wherein the layered diesel oxidation catalyst is located upstream of the catalyzed soot filter.

31. Use of the layered diesel oxidation catalyst according to any of embodiments 1 to 26 for treating a gaseous exhaust stream of a diesel engine.

In the following, the present invention is further illustrated by the following examples.

EXAMPLES

1. Catalyst Preparation

Sample A) According to the Invention
For the 1$^{st}$ (bottom) layer a Palladium nitrate solution was added to 0.75 g/in$^3$ high porous gamma-alumina resulting in 22 g/ft$^3$ Pd. The resulting frit was dispersed in water and acetic acid and milled to a particle size $d_{90}$ of 25 micrometer.

Into this slurry 0.75 g/in$^3$ of a material consisting of ZrO$_2$: 43.5 wt %, CeO$_2$: 45 wt %, La$_2$O$_3$: 8 wt %, Pr$_6$O$_{11}$: 2 wt %, and HfO$_2$: 1.5% was dispersed and milled to a particle size d$_{90}$ of 7 micrometer. The final slurry was coated onto a monolith, dried at 110° C. in air and calcined at 450° C. in air.

For the 2$^{nd}$ (middle) layer 1.5 g/in$^3$ of high porous gamma-alumina was impregnated with an aqueous solution of Palladium nitrate giving a final dry Pd content of 30 g/ft$^3$. The resulting powder was dispersed in water. Platinum solution with Platinum as an ammine stabilized hydroxo Pt IV complex was added to give a dry Pt content of 60 g/ft$^3$. After adjusting the pH of the slurry to 4.5 the slurry was milled to a particle size d$_{90}$ of 16 μm. The slurry was subsequently coated onto the 1$^{st}$ layer, dried at 110° C. in air and calcined at 450° C. in air.

For the 3$^{rd}$ (top) layer 0.25 g/in$^3$ of high porous gamma-alumina and 0.5 g/in$^3$ of a material consisting of ZrO$_2$: 43.5 wt %, CeO$_2$: 45 wt %, La$_2$O$_3$: 8 wt %, Pr$_6$O$_{11}$: 2 wt %, and HfO$_2$: 1.5% were mixed and impregnated with an aqueous solution of Palladium nitrate giving a final dry Pd content of 8 g/ft$^3$. Subsequently the impregnated material was dispersed in water and acetic acid and milled to a particle size d$_{90}$ of 20 micrometer. 0.5 g/in$^3$ H-beta zeolite was immersed in water to a solid content of 45%. The precious metal containing slurry was mixed with the H-beta zeolite containing slurry, milled to a particle size dm of 15 μm and subsequently coated onto the 2$^{nd}$ layer, dried at 110° C. in air and calcined at 450° C. in air.

Sample B) According to the Invention

For the 1$^{st}$ (bottom) layer a Palladium nitrate solution was added to a mixture of high porous gamma-alumina (0.75 g/in$^3$) and 100% Ceria material (0.75 g/in$^3$) resulting in 36 g/ft$^3$ Pd. The resulting frit was dispersed in water and acetic acid and milled to a particle size d$_{90}$ of 7 micrometer. The final slurry was coated onto a monolith, dried at 110° C. in air and calcined at 450° C. in air.

For the 2$^{nd}$ (middle) layer 1.5 g/in$^3$ of high porous gamma-alumina was impregnated with an aqueous solution of Palladium nitrate giving a final dry Pd content of 26 g/ft$^3$. The resulting powder was dispersed in water. Platinum solution with Platinum as an ammine stabilized hydroxo Pt IV complex was added to give a dry Pt content of 52 g/ft$^3$. After adjusting the pH of the slurry to 4.5 the slurry was milled to a particle size d$_{90}$ of 16 μm. The slurry was subsequently coated onto the 1$^{st}$ layer, dried at 110° C. in air and calcined at 450° C. in air.

For the 3$^{rd}$ (top) layer high porous gamma-alumina (0.25 g/in$^3$) and 100% Ceria material (0.5 g/in$^3$) were mixed and impregnated with an aqueous solution of Palladium nitrate giving a final dry Pd content of 8 g/ft$^3$. Subsequently the impregnated material was dispersed in water and acetic acid and milled to a particle size d$_{90}$ of 20 micrometer. 0.5 g/in$^3$ H-beta zeolite was immersed in water to a solid content of 45%. The precious metal containing slurry was mixed with the H-beta zeolite containing slurry, milled to a particle size d$_{90}$ of 15 μm and subsequently coated onto the 2$^{nd}$ layer, dried at 110° C. in air and calcined at 450° C. in air.

Sample C) According to the Invention

For the 1$^{st}$ (bottom) layer a Palladium nitrate solution was added to a mixture of high porous gamma-alumina (0.75 g/in$^3$) and 100% Ceria material (0.75 g/in$^3$) resulting in 30 g/ft$^3$ Pd. The resulting frit was dispersed in water and acetic acid and milled to a particle size d$_{90}$ of 7 micrometer. The final slurry was coated onto a monolith, dried at 110° C. in air and calcined at 450° C. in air.

For the 2$^{nd}$ (top) layer 1 g/in$^3$ of high porous gamma-alumina was impregnated with an aqueous solution of Palladium nitrate giving a final dry Pd content of 30 g/ft$^3$. The resulting powder was dispersed in water. Platinum solution with Platinum as an ammine stabilized hydroxo Pt IV complex was added to give a dry Pt content of 60 g/ft$^3$. After adjusting the pH of the slurry to 4.5 the slurry was milled to a particle size d$_{90}$ of 16 μm. H-beta zeolite was immersed in water to a solid content of 45%. The precious metal containing slurry was then mixed with the H-beta zeolite containing slurry, milled to a particle size d$_{90}$ of 15 μm and subsequently coated onto the 1$^{st}$ layer, dried at 110° C. in air and calcined at 450° C. in air.

Sample D) Not According to the Invention

For the 1$^{st}$ (bottom) layer a Palladium nitrate solution was added to 0.75 g/in$^3$ high porous gamma-alumina resulting in 22 g/ft$^3$ Pd. The resulting frit was dispersed in water and acetic acid and milled to a particle size d$_{90}$ of 25 micrometer. Into this slurry 0.75 g/in$^3$ high porous gamma-alumina was dispersed and milled to a particle size d$_{90}$ of 7 micrometer. The final slurry was coated onto a monolith, dried at 110° C. in air and calcined at 450° C. in air.

For the 2$^{nd}$ (middle) layer 1.5 g/in$^3$ of high porous gamma-alumina was impregnated with an aqueous solution of Palladium nitrate giving a final dry Pd content of 30 g/ft$^3$. The resulting powder was dispersed in water. Platinum solution with Platinum as an ammine stabilized hydroxo Pt IV complex was added to give a dry Pt content of 60 g/ft$^3$. After adjusting the pH of the slurry to 4.5 the slurry was milled to a particle size d$_{90}$ of 16 μm. The slurry was subsequently coated onto the 1$^{st}$ layer, dried at 110° C. in air and calcined at 450° C. in air.

For the 3$^{rd}$ (top) layer 0.75 g/in$^3$ high porous gamma-alumina was impregnated with an aqueous solution of Palladium nitrate giving a final dry Pd content of 8 g/ft$^3$. Subsequently the impregnated material was dispersed in water and acetic acid and milled to a particle size d$_{90}$ of 20 micrometer. 0.5 g/in$^3$ H-beta zeolite was immersed in water to a solid content of 45%. The precious metal containing slurry was mixed with the H-beta zeolite containing slurry, milled to a particle size d$_{90}$ of 15 μm and subsequently coated onto the 2$^{nd}$ layer, dried at 110° C. in air and calcined at 450° C. in air.

Sample E) Not According to the Invention

For the 1$^{st}$ (bottom) layer 1 g/in$^3$ high porous gamma-alumina was dispersed in water and acetic acid and milled to a particle size d$_{90}$ of 15 micrometer. The final slurry was coated onto a monolith, dried at 110° C. in air and calcined at 450° C. in air.

For the 2$^{nd}$ (middle) layer 1.5 g/in$^3$ high porous gamma-alumina was impregnated with an aqueous solution of Palladium nitrate giving a final dry Pd content of 28 g/ft$^3$. The resulting powder was dispersed in water. Platinum solution with Platinum as an ammine stabilized hydroxo Pt IV complex was added to give a dry Pt content of 52 g/ft$^3$. After adjusting the pH of the slurry to 4.5 the slurry was milled to a particle size d$_{90}$ of 16 μm. The slurry was subsequently coated onto the 1$^{st}$ layer, dried at 110° C. in air and calcined at 450° C. in air.

For the 3$^{rd}$ (top) layer 0.25 g/in$^3$ high porous gamma-alumina was dispersed in water and acetic acid and milled to a particle size d$_{90}$ of 20 micrometer. 0.5 g/in$^3$ H-beta zeolite was immersed in water to a solid content of 45%. To this slurry a platinum precursor solution with platinum as an ammine stabilized hydroxo Pt IV complex was added to give a Pt content of 8 g/ft$^3$. The precious metal containing slurry was mixed with the alumina containing slurry, milled to a particle size d$_{90}$ of 15 μm and subsequently coated onto the 2$^{nd}$ layer, dried at 110° C. in air and calcined at 450° C. in air.

2. Testing of HC/CO Gas Activity Performance

Sample A) According to the Invention
 1st Layer: 22 g/ft³ Pd, 0.75 g/in³ ($ZrO_2$: 43.5 wt %, $CeO_2$: 45 wt %, $La_2O_3$: 8 wt %, $Pr_6O_{11}$: 2 wt %, and $HfO_2$: 1.5%), 0.75 g/in³ high porous gamma-alumina
 2nd Layer: 60 g/ft³ Pt, 30 g/ft³ Pd, 1.5 g/in³ high porous gamma-alumina
 3rd Layer: 8 g/ft³ Pd, 0.25 g/in³ high porous gamma-alumina, 0.5 g/in³ H-Beta zeolite, 0.5 g/in³ ($ZrO_2$: 43.5 wt %, $CeO_2$: 45 wt %, $La_2O_3$: 8 wt %, $Pr_6O_{11}$: 2 wt %, and $HfO_2$: 1.5%)

Sample B) According to the Invention
 1st Layer: 36 g/ft³ Pd, 0.75 g/in³ Ceria, 0.75 g/in³ high porous gamma-alumina
 2nd Layer: 52 g/ft³ Pt, 26 g/ft³ Pd, 1.5 g/in³ high porous gamma-alumina
 3rd Layer: 16/ft³ Pd, 0.25 g/in³ high porous gamma-alumina, 0.5 g/in³ H-Beta zeolite, 0.5 g/in³ 100% Ceria Sample C) According to the Invention
 1st Layer: 36 g/ft³ Pd, 0.75 g/in³ Ceria, 0.75 g/in³ high porous gamma-alumina
 2nd Layer: 60 g/ft³ Pt, 30 g/ft³ Pd, 1 g/in³ high porous gamma-alumina 0.5 g/in³ H-Beta zeolite Sample D) Not According to the Invention
 1st Layer: 22 g/ft³ Pd, 1.5 g/in³ high porous gamma-alumina
 2nd Layer: 60 g/ft³ Pt, 30 g/ft³ Pd, 1.5 g/in³ high porous gamma-alumina
 3rd Layer: 8 g/ft³ Pd, 0.75 g/in³ high porous gamma-alumina, 0.5 g/in³ H-Beta zeolite Sample E) Not According to the Invention
 1st Layer: 1 g/in³ high porous gamma-alumina
 2nd Layer: 72 g/ft³ Pt, 40 g/ft³ Pd, 1.5 g/in³ high porous gamma-alumina
 3rd Layer: 8 g/ft³ Pt, 0.25 g/in³ high porous gamma-alumina, 0.5 g/in³ H-Beta zeolite 3. Light-Off Performance Testing Samples A), B), C), D) and E) were tested for CO and HC light-off performance. Prior to testing the samples were aged in the exhaust stream of a 4 cylinder light duty diesel engine with 2.7 L engine displacement for 25 h. The temperature of the exhaust stream was raised by an upstream burner DOC to 750° C. steady state.

For light-off testing each sample was placed downstream in the exhaust line of a 6 cylinder light duty diesel engine with a 3 L engine displacement. The CO and HC concentration in the exhaust stream was constant at 1500 ppm and 300 ppm ($C_3$ basis), respectively. The gas flow under standard conditions was around 60 m³/h. The temperature ramp was 40° C./min.

A lower light-off temperature characterizes a better gas activity.

Figure 1:
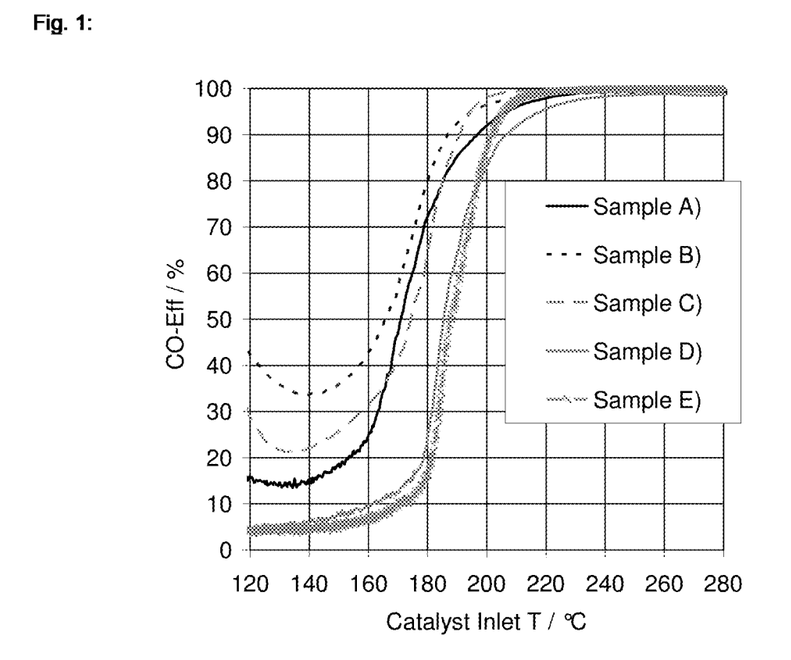

As can be taken from FIG. 1 showing the CO light-off curves for Samples A), B), C), D) and E), Samples A), B) and C) according to the invention show higher CO conversion at lower temperatures compared to Samples D) and E) not according to the invention.

Figure 2:
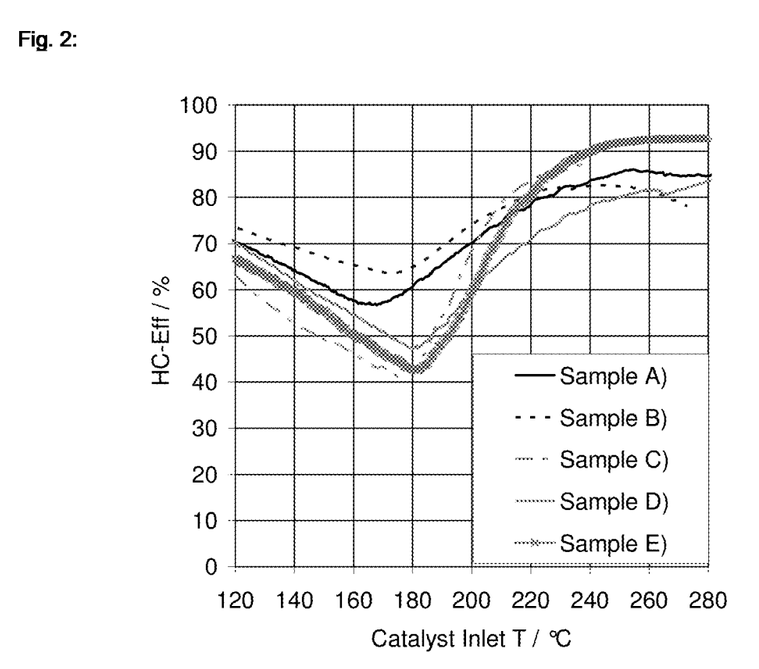

As can be taken from FIG. 2 showing the HC light-off curves for Samples A), B), C), D) and E), Samples A) and B) according to the invention show higher HC conversion at lower temperatures compared to Samples D) and E) not according to the invention. Sample C) according to the invention shows a lower light-off temperature at around 70% HC conversion compared to Samples D) and E) not according to the invention.

Figure 3:
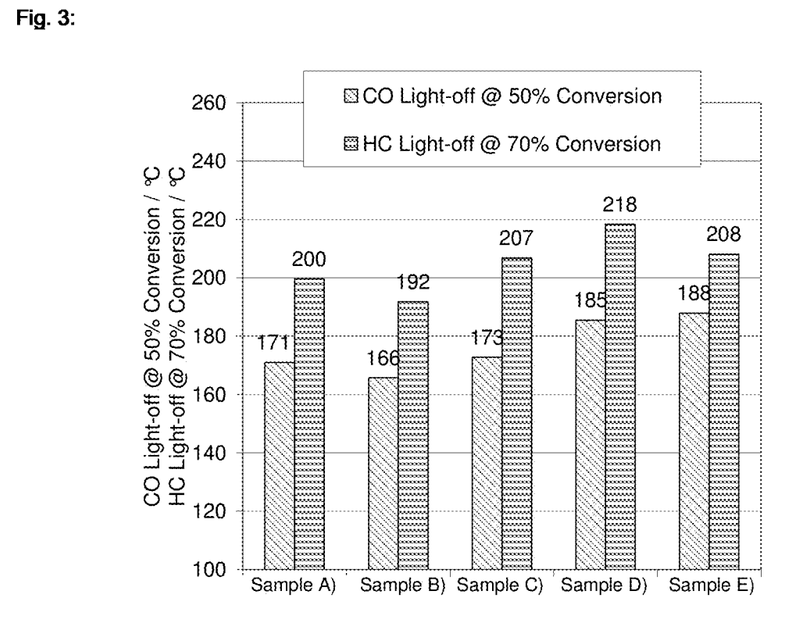
FIG. 3 shows HC and CO light-off temperatures at 50% conversion (CO) and 70% conversion (HC) obtained from the treatment of diesel exhaust using the DOCs according to Samples A), B), C), D) and E). The x-axis of the diagram shows the respective Samples A) to E), whereas the y-axis denoted "CO Light-off @ 50% Conversion/° C." and "HC Light-off @ 70% Conversion/° C." shows the corresponding temperatures at which 50% of CO are oxidized to CO$_2$ and at which 70% of HC are oxidized to CO$_2$, respectively, and ranges from 100° C. to 260° C. The values for CO conversion are displayed as checkered bars, and the values for HC conversion are displayed as dashed bars.

As can be taken from FIG. 3 showing the HC and CO light-off temperatures for Samples A), B), C), D) and E), precious metal cost reduced Samples A), B), and C) according to the invention show lower light-off temperatures at 50% CO conversion and 70% HC conversion compared to Samples D) and E) not according to the invention.

The invention claimed is:

1. A layered diesel oxidation catalyst (DOC) comprising:
 a) a carrier substrate
 b) a diesel oxidation catalytic material comprising
  b1) a first layer located on the carrier substrate, the first layer comprising palladium impregnated on a support material comprising ceria in an amount of at least 45 weight-% based on the total weight of the support material, and optionally comprising platinum;
  b2) a second layer located on the first layer, the second layer comprising palladium and platinum each impregnated on a support material comprising a metal oxide;
 wherein the platinum to palladium weight ratio of the first layer is lower than the platinum to palladium weight ratio of the second layer.

2. The layered diesel oxidation catalyst according to claim 1, wherein the platinum to palladium weight ratio of the first layer is in the range of from 0:1 to 1.1:1.

3. The layered diesel oxidation catalyst according to claim 1, wherein the platinum to palladium weight ratio of the second layer is in the range of from 1:0 to 1.1:1.

4. The layered diesel oxidation catalyst according to claim 1, wherein the ratio of the platinum to palladium weight ratio of the first layer to the platinum to palladium weight ratio of the second layer is lower than or equal to 0.9.

5. The layered diesel oxidation catalyst according to claim 1, wherein the support material of the first layer comprises ceria in an amount of at least 65 weight-% based on the total weight of the support material.

6. The layered diesel oxidation catalyst according to claim 1, wherein the support material of the first layer further comprises zirconia and/or alumina.

7. The layered diesel oxidation catalyst according to claim 1, wherein the support material of the first layer further comprises a modifier selected from the group consisting of $La_2O_3$, $Pr_6O_{11}$, $HfO_2$, $Y_2O_3$, $Yb_2O_3$, YbO, $Nd_2O_3$, NdO, $WO_3$, $SiO_2$, $TiO_2$ and combinations of two or more thereof.

8. The layered diesel oxidation catalyst according to claim 1, wherein the support material of the second layer comprises a metal oxide selected from the group consisting of alumina, zirconia, silica, titania, silica-alumina, alumina-zirconia, titania-silica, titania-zirconia, titania-alumina, and combinations of two or more thereof.

9. The layered diesel oxidation catalyst according to claim 1, wherein the second layer has a ceria content of not more than 5 weight-%.

10. The layered diesel oxidation catalyst according to claim 1, wherein the first layer comprises palladium in an amount of from 6 to 60 g/ft³.

11. The layered diesel oxidation catalyst composite according to claim 1, wherein the first layer comprises platinum in an amount of from 15 to 40 g/ft³.

12. The layered diesel oxidation catalyst according to claim 1, wherein the second layer comprises platinum and palladium in a total amount of from 30 to 180 g/ft³.

13. The layered diesel oxidation catalyst according to claim 1, wherein the diesel oxidation catalytic material comprises platinum and palladium in a total amount of from 30 to 240 g/ft$^3$.

14. The layered diesel oxidation catalyst according to claim 1, wherein the second layer further comprises a hydrocarbon storage compound.

15. The layered diesel oxidation catalyst according to claim 1, further comprising an undercoat layer located between the carrier substrate and the first layer.

16. The layered diesel oxidation catalyst according to claim 15, wherein the undercoat layer comprises alumina.

17. The layered diesel oxidation catalyst according to claim 1, wherein the carrier substrate is a flow-through substrate or a wall flow substrate.

18. The layered diesel oxidation catalyst according to claim 1, wherein the carrier substrate comprises a material selected from the group consisting of cordierite, cordierite-alumina, silicon nitride, silicon carbide, zircon mullite, spodumene, alumina-silica magnesia, zircon silicate, sillimanite, magnesium silicate, zircon, petalite, alumina, alumosilicate and combinations of two or more thereof.

19. The layered diesel oxidation catalyst according to claim 1, further comprising
b3) a third layer located on the second layer, the third layer comprising palladium impregnated on a support material comprising ceria in an amount of at least 45 weight-% based on the total weight of the support material, and optionally comprising platinum,
wherein the platinum to palladium weight ratio of the third layer is lower than the platinum to palladium weight ratio of the second layer.

20. The layered diesel oxidation catalyst according to claim 19, wherein the ratio of the platinum to palladium weight ratio of the third layer to the platinum to palladium weight ratio of the second layer is lower than or equal to 0.9.

21. The layered diesel oxidation catalyst according to claim 19, wherein the support material of the third layer comprises ceria in an amount of at least 65 weight-% based on the total weight of the support material.

22. The layered diesel oxidation catalyst according to claim 19, wherein the support material of the third layer further comprises zirconia and/or alumina.

23. The layered diesel oxidation catalyst according to claim 19, wherein the support material of the third layer further comprises a modifier selected from the group consisting of $La_2O_3$, $Pr_6O_{11}$, $HfO_2$, $Y_2O_3$, $Yb_2O_3$, $YbO$, $Nd_2O_3$, $NdO$, $WO_3$, $SiO_2$, $TiO_2$ and combinations of two or more thereof.

24. The layered diesel oxidation catalyst according to claim 19, wherein the third layer comprises palladium in an amount of from 2 to 30 g/ft$^3$.

25. The layered diesel oxidation catalyst according to claim 19, wherein the third layer comprises platinum in an amount of from 4 to 16 g/ft$^3$.

26. The layered diesel oxidation catalyst according to claim 19, wherein the third layer further comprises a hydrocarbon storage compound.

27. The layered diesel oxidation catalyst according to claim 1 comprised in a system for treating of a gaseous exhaust stream of a diesel engine, the system further comprising:
an exhaust conduit in fluid communication with the diesel engine via an exhaust manifold, and
one or more of the following in fluid communication with the layered diesel oxidation catalyst composite: a catalyzed soot filter (CSF), a selective catalytic reduction (SCR) article, a NOx storage and reduction (NSR) catalytic article.

28. A process for the preparation of the layered diesel oxidation catalyst according to claim 1, comprising the steps of
(i) providing a carrier substrate;
(ii) optionally applying an undercoat layer on the carrier substrate;
(iii) applying a first layer on the carrier substrate or the undercoat layer, the first layer comprising palladium impregnated on a support material comprising ceria in an amount of at least 45 weight-% based on the total weight of the support material, and optionally comprising platinum;
(iv) applying a second layer on the first layer, the second layer comprising palladium and platinum each impregnated on a support material comprising a metal oxide, wherein the platinum to palladium weight ratio of the first layer is lower than the platinum to palladium weight ratio of the second layer;
(v) optionally applying a third layer on the second layer, the third layer comprising palladium impregnated on a support material comprising ceria
in an amount of at least 45 weight-% based on the total weight of the support material, and optionally comprising platinum,
wherein the platinum to palladium weight ratio of the third layer is lower than the platinum to palladium weight ratio of the second layer.

29. A system for treating a gaseous exhaust stream of a diesel engine, the system comprising:
an exhaust conduit in fluid communication with the diesel engine via an exhaust manifold,
the layered diesel oxidation catalyst according to claim 1, wherein the carrier substrate is a wall-flow substrate or a flow through substrate, and
one or more of the following in fluid communication with the layered diesel oxidation catalyst composite: a catalyzed soot filter (CSF), a selective catalytic reduction (SCR) article, a NOx storage and reduction (NSR) catalytic article.

30. The system according to claim 29 comprising a catalyzed soot filter, wherein the layered diesel oxidation catalyst is located upstream of the catalyzed soot filter.

31. A method for treating a gaseous exhaust stream of a diesel engine comprising contacting the exhaust stream with the layered diesel oxidation catalyst of claim 1.

* * * * *